United States Patent [19]

Azzam

[11] 4,254,489
[45] Mar. 3, 1981

[54] ELECTRO-OPTICAL TIME-INDICATING SYSTEM

[75] Inventor: Nadim Azzam, Neufahrn, Fed. Rep. of Germany

[73] Assignee: Eurosil GmbH, Munich, Fed. Rep. of Germany

[21] Appl. No.: 61,178

[22] Filed: Jul. 27, 1979

[30] Foreign Application Priority Data

Aug. 5, 1978 [DE] Fed. Rep. of Germany ....... 2834387

[51] Int. Cl.³ ............................................ G04C 19/00
[52] U.S. Cl. ..................................... 368/84; 368/240; 368/242; 340/753; 340/765
[58] Field of Search ................ 58/50 R, 50 A, 127 R; 340/753, 754; 324/186; 235/92 T, 92 TF, 92 EA, 92 PE; 368/82-84, 226, 239-242

[56] References Cited

U.S. PATENT DOCUMENTS

| 3,276,200 | 10/1966 | Freeman | 58/50 R |
| 4,095,414 | 6/1978 | Reich | 58/50 R |

*Primary Examiner*—Vit W. Miska
*Attorney, Agent, or Firm*—Burns, Doane, Swecker & Mathis

[57] ABSTRACT

An electro-optical time-indicating system displays the time by simulating a clock using dial hands. The electrodes of a liquid crystal display are formed by radial track segments and the backing electrodes are subdivided into inner and outer electrodes. The driving of the track segments to indicate hours, minutes and seconds is accomplished by a time division multiplex technique. In order to keep the number of electrode terminals for the track segments to a minimum, the track segments are combined into L track segment cascades with L input terminals. The track segments are arranged in K twin sets such that, as viewed in the clockwise direction, an $n^{th}$ track segment (where n ranges from 1 to L) of one set of the twin sets is always connected with the $L+1-n^{th}$ track segment of the other set of a twin set. The inner backing electrodes are subdivided into M inner blocks with one terminal each, and the outer backing electrodes are divided into N outer blocks with one terminal each. Each twin set is covered by two adjacent inner blocks and two adjacent outer blocks. The time-functional drive of the terminals of the track segment cascades takes place alternatingly in ascending and in descending order, and successive terminals of the inner and outer blocks are energized in a clockwise direction after every change-over between ascending and descending drive.

3 Claims, 6 Drawing Figures

ELECTRO-OPTICAL TIME-INDICATING SYSTEM

BACKGROUND OF THE INVENTION

The present invention relates to an electro-optical, time-indicating system which indicates the time in the fashion of a clock using dial hands, wherein the electrodes of the display, preferably a liquid crystal display, are formed by radially spaced electrode tracks and the backing electrodes are subdivided into inner and outer electrodes, and wherein the drive of the electrode tracks is accomplished by time division multiplexing to indicate hours, minutes and seconds.

Electro-optical time-indicating systems of this type have an advantage in that the type of display offered by these systems is easily read and is accomplished without the use of mechanically moving pointers. A time-indicating system of the type defined above is disclosed in published German Patent Application No. 2,451,057, wherein 60 radial electrode tracks of a liquid crystal display are circumferentially distributed over a dial. Inner track sections are used to indicate the hour, and outer sections are used to indicate the second. Minutes are shown jointly by both sections. The electrodes of each of the tracks are provided with separate, individual terminals. Two concentric backing electrodes are used, with the inner electrode assigned to the inner sections of the tracks and the outer electrode to the outer track sections. A total of 62 electrode terminals are therefore required. Such a great number of electrode terminals is not desirable, because of the great amount of space required by such an arrangement, and because of the great number of components and high cost involved.

Published German Patent Application No. 2,410,527 discloses a time-indicating system which requires a lesser number of electrode terminals. The reduction in the number of electrode terminals attained by this system is partially due to the fact that the seconds are not shown by the simulation of a pointer but by the blinking of one spot. Furthermore, the number of tracks used for the hour display is limited (e.g., 12), so that the display does not move prior to the arrival of the next hour. Finally, the minute display does not simulate a minute hand. Therefore, the indication of time displayed by this system differs from the indication used by a clock with dial hands.

OBJECT AND BRIEF SUMMARY OF THE INVENTION

It is therefore an object of the present invention to provide a novel time-indicating system of the type described which will require only a small number of electrode terminals for driving the electrode tracks.

The present invention achieves this objective by arranging the electrodes such that the electrode tracks with the function of indicating hours, minutes and seconds are combined into L track cascades with L terminals, L being an integer. In addition, the tracks are arranged in K twin sets in such a manner that, as viewed in the clockwise direction, an nth track (n ranging from 1 to L) of one set of the twin sets is always connected with the L+1-nth track of the other set of the twin sets. Furthermore, the inner electrodes are subdivided into M inner blocks with one terminal each, and the outer electrodes are divided into N outer block with one terminal each. Each twin set of electrode tracks is covered by two adjacent inner blocks and two adjacent outer blocks. The time-functional drive of the terminals of the track cascades takes place alternatingly in ascending and descending order, and after every change between ascending and descending actuation of the electrodes of the cascades, the terminals of the inner and outer blocks which are next closest in the clockwise direction are energized. This system only requires L+M+N electrode terminals. Assuming for example a total of 60 tracks, it would be expedient to combine these tracks into ten track cascades and to use six inner and six outer blocks, requiring only a total of 22 electrode terminals to indicate the time in the fashion of a clock with hour, minute and second hands.

The desired, clockwise running display is attained by the specific arrangement of the track cascades in twin sets, with each set covering one inner and one outer block, and by the alternate ascending and descending drive of the track cascades and the progressive drive of the inner and outer blocks.

The present invention provides an additional advantage in that the circuit plate for the series-connected electrodes and the circuit plate carrying the backing electrodes, which are connected to the inner and the outer blocks, are free of any crossing points of electrode connections.

BRIEF DESCRIPTION OF THE DRAWINGS

Advantageous further developments of the invention will become apparent to those of ordinary skill in the art upon a perusal of the following description and the drawings in which.

DETAILED DESCRIPTION

Figure 2:
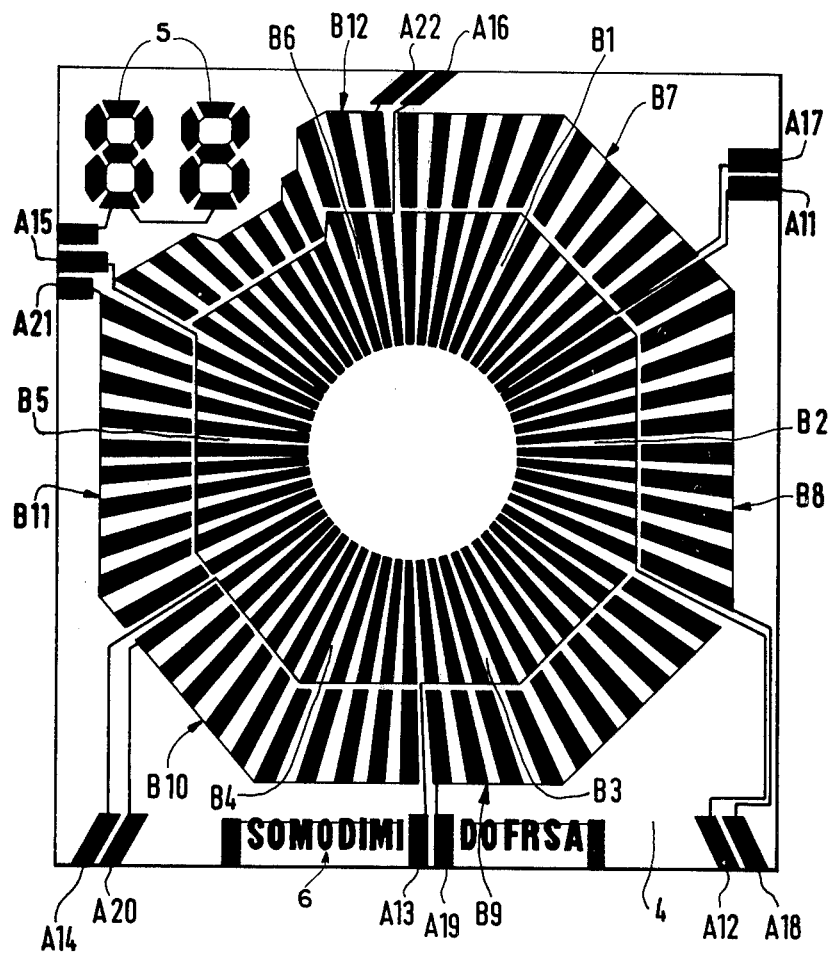
FIG. 2 illustrates the lower circuit plate of the time-indicating system.

An upper circuit plate 1 includes 60 circumferentially spaced radial conductive tracks S1 to S60. Each of these tracks has one outer section 2 and one inner section 3. The tracks form the upper, or primary, electrodes of a liquid crystal element which is placed between the upper circuit plate 1 and a lower circuit plate 4 (see FIG. 2). The lower circuit plate 4 has correspondingly arranged lower, or backing, electrodes. The electrode track sections 2 and 3 are translucent, as known per se.

Figure 1:
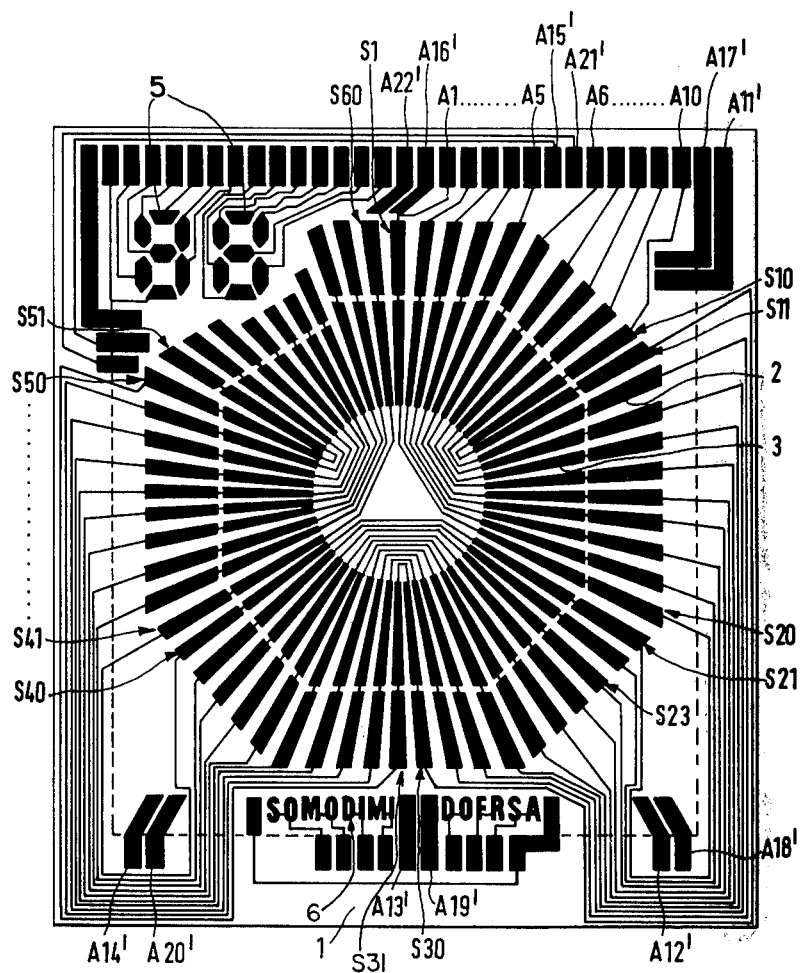
FIG. 1 illustrates the upper circuit plate of an electro-optical time-indicating system.

The electrode tracks S1 to S60 are combined into ten track cascades. The first track cascade contains the electrode tracks S1, S20, S21, S40, S41 and S60 electrically connected in series. A terminal A1 is provided for furnishing a current signal to this track cascade. The wires connecting the track cascades are arranged in a meandering fashion. The same arrangement applies to all other track cascades. The terminals of these other track cascades are shown in FIG. 1 and denoted by reference numerals A2 to A10. The backing electrodes, arranged on the lower circuit plate 4, are subdivided into six inner blocks B1 to B6 and six outer blocks B7 to B12. For each of the blocks B1 to B12 there is provided a connecting terminal, A11 to A22, respectively.

The electrode tracks S1 to S10, S11 to S20, S21 to S30, S31 to S40, S41 to S50 and S51 to S60 are arranged in sets, with the outer track sections 2 of one set always covering one outer block of the backing electrodes. The inner track sections 3 of a set are located above one inner block of the backing electrodes. The electrode track sets S1 to S10 and S11 to S20 form a twin set where, as viewed in the clockwise direction, the first, second, etc. up to the tenth electrode track of one set of the twin set are electrically connected with the tenth, ninth etc. up to the first track of the other set of the twin set. The electrode track sets S21 to S30 and S31 to S40 form a second twin set and the electrode track sets S41 to S50 and S51 to S60 form a third twin set. Each twin set coincides with two adjacent inner blocks and two adjacent outer blocks of the backing electrodes. For example, the twin set of the electrode tracks S1 to S2 covers the inner blocks B1 and B2 and the outer blocks B7 and B8 of the backing electrodes.

Rather than being connected to the first track of each electrode track set, the connecting terminal A1 is connected to the first track of the first and the last track, alternatingly, of each set, i.e., the electrode tracks S1, S20, S21, S40, S41 and S60. This connection arrangement applies correspondingly to the other connecting terminals A2 to A10. FIG. 1 illustrates the manner in which the meandering connections of tracks S1 to S60 eliminate any crossing points of the connecting wires.

The connecting terminals A11 to A22 of the lower circuit plate 4 contact the upper plate 1 by means of contacts (not illustrated). Terminals A11' to A22' are arranged on the upper plate 1 for electrical connection of the backing electrodes of the lower plate 4. The upper electrodes S1–S60 and the backing electrodes can be connected with the circuitry illustrated in detail in FIG. 3 by means of the connecting terminals A1–A22.

The circuit plates 1 and 4 may also contain electrode tracks 5 for displaying the date and electrode tracks 6 for displaying the day of the week.

Figure 6:
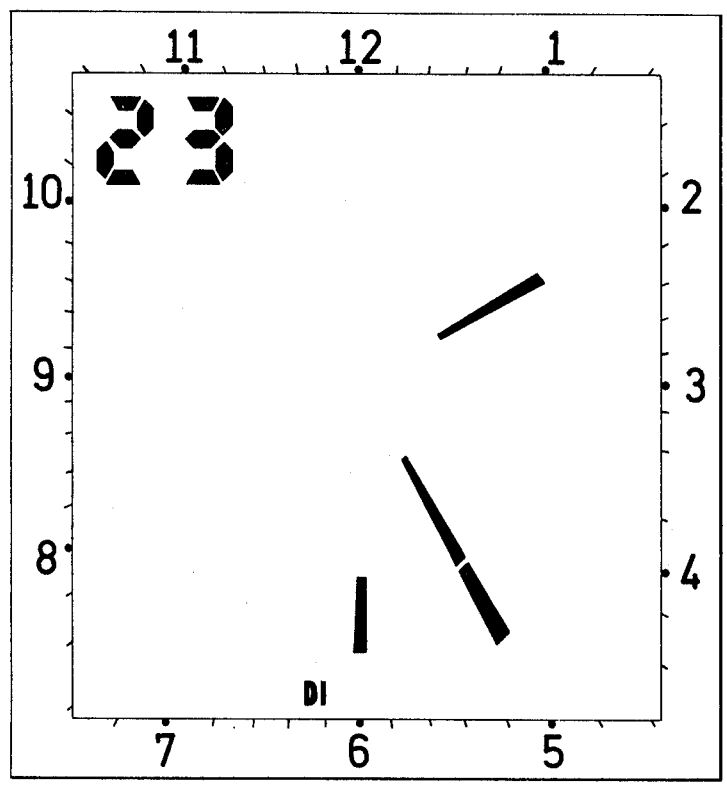
FIG. 6 shows the face of the time indicator.

The above-described configuration of the upper electrodes and backing electrodes demonstrates that the liquid crystal panel, located between the two plates, can be used for a display which covers the area of each of the individual electrode tracks S1 to S60, or their respective track sections 2 or 3, with only 22 terminals. An hour display is accomplished by a suitable voltage across the proper terminal of the terminals A1 to A10 of the track cascades and the proper terminal A11 to A16 of the inner blocks. A minute display is accomplished by a voltage across one of the terminals A1 to A10, one of the terminals A11 to A16, and one of the terminals A17 to A22. A display of seconds is produced by a proper voltage across one of the terminals A1 to A10 and one of the terminals A17 to A22 of the outer blocks B7 to B12. For example, FIG. 6 illustrates a display of the time 25 minutes and 30 seconds after the hour of 2 o'clock in this manner.

Figure 3:
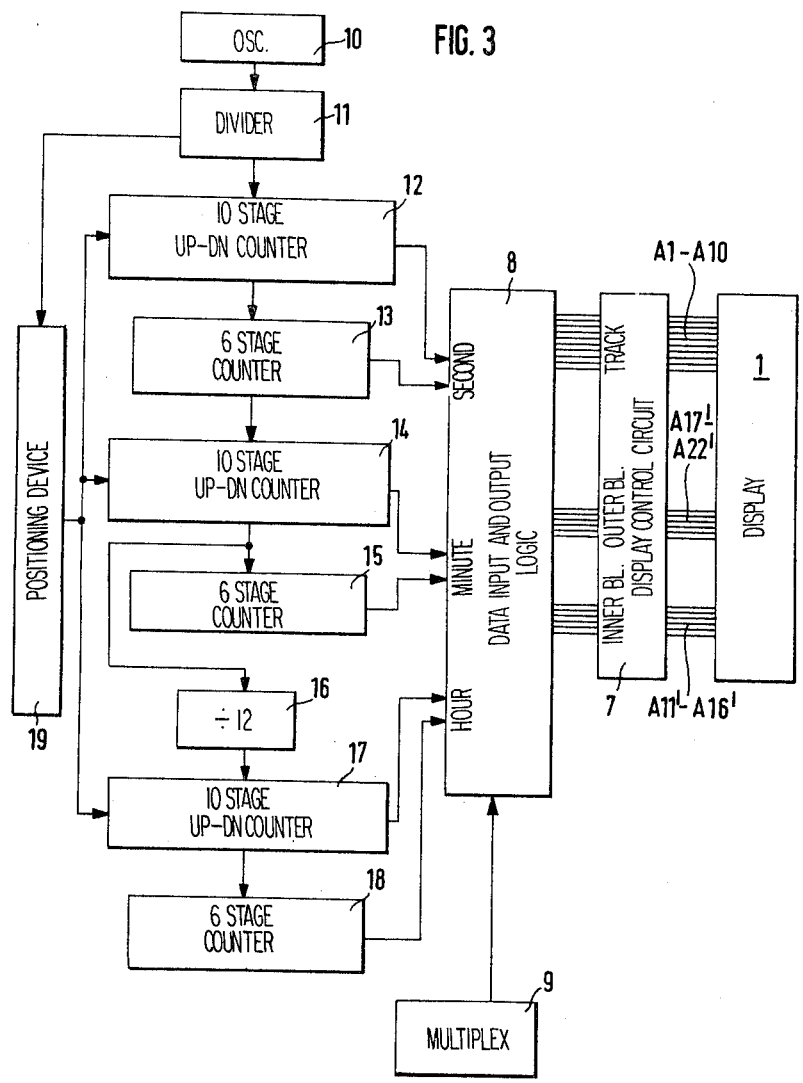
FIG. 3 is a block diagram of the control circuit.

A display simulating the advance of a clock hand is not accomplished with a cyclic, time-functional application of current to the terminals A1 to A10. Rather, the terminals A1 to A10 are driven alternatingly in ascending order, that is from A1 to A10, and descending order, that is from A10 to A1. Up-down counters are used for this purpose, as illustrated in FIG. 3. The terminals A11 to A16 of the inner blocks B1 to B6 are advanced successively after each change-over from ascending to descending drive of the terminnals A1 to A10, and vice versa.

Figure 4:
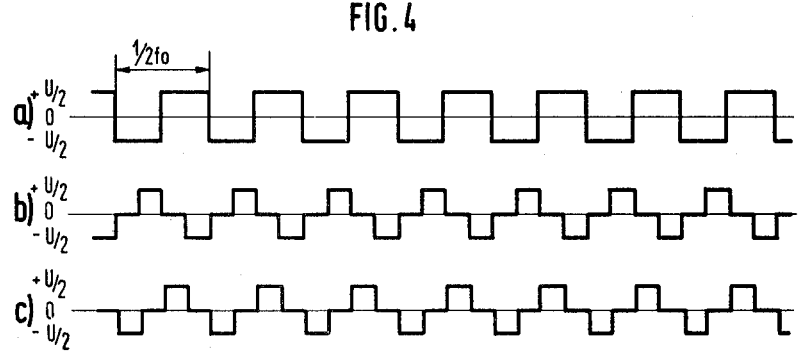
FIG. 4 illustrates the types of signals used in the control circuit.
Figure 5:
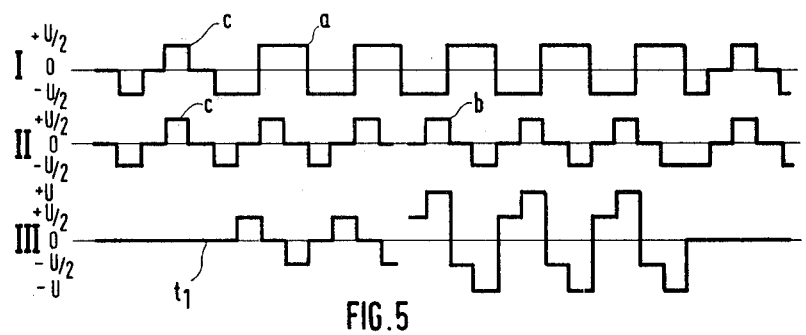
FIG. 5 shows one example of the electrode drive on the basis of the signals illustrated in FIG. 4.

A display control circuit 7 with the primary function of generating output signals, which are illustrated in detail by FIGS. 4 and 5, is connected in series with terminals A1 to A10 and A11' to A22', as shown in FIG. 3. A time data input and output logic circuit 8, which is controlled by a multiplex unit 9 carrying the time data for seconds, minutes and hours, is connected to the display control circuit 7. The multiplex unit 9 is provided to enable the display to show hours, minutes and seconds simultaneously, rather than successively.

The frequency of an output signal from a time base 10, for example a crystal oscillator, is divided in a known manner by way of a frequency divider 11, to obtain a signal of one cycle per second. This 1 c/s frequency is fed into a 10 stage up-down counter 12 which actuates the terminals A1 to A10 in such a manner that it energizes the terminals A1 to A10 in ascending order and A10 to A1 in descending order alternatingly. At every change-over of the up-down counter 12 from ascending to descending counting, or vice versa, a 6 stage counter or register 13 is advanced by one position to successively actuate one of the outer blocks B7 to B12. As a result, a display of the seconds, which advances from one second to the next in clockwise direction, is produced under the control of the multiplex unit 9.

The counter 13 is followed by another 10 stage up-down counter 14 which operates in the same manner as the counter 12 to control the display of the minute. This up-down counter 14 is followed by another 6 stage counter 15 which simultaneously controls the inner blocks B1 to B6 and the outer blocks B7 to B12. This arrangement will generate, under the control of the multiplex unit 9, a display of minutes which advances in the fashion of a minute hand.

The up-down counter 14 is further connected in series with a divider 16. The divider has a division ratio of 1:12 and controls another 10 stage up-down counter 17 which will energize the terminals A1 to A10 and A10 to A1, respectively, in the manner described above for the display of the hour. This up-down counter 17 advances, at every change-over, another 6 stage counter 18 by one position to control the inner blocks B1 to B6 so that the counters 17 and 18 produce, under the control of the multiplex unit 9, an hour display which advances continuously in a clockwise direction. This hour display is not limited to full hour increments but will also show intermediate values.

A positioning device 19 is provided for adjusting the time of the clock.

The display control circuit 7 delivers output signals such as those shown in FIG. 4. The signal a is conducted to the terminals A1 to A10, which are driven by the time data input and output logic circuit 8. The signal b is conducted to the terminals A11' to A22', to control the inner or outer blocks. The signal c is applied to those terminals of the inner blocks, outer blocks and track sets which are not being energized. The signals a, b and c have the same frequency, for example twice the scan frequency of the multiplex unit 9. The signals b and c are identical in shape but are out of phase with each other.

FIG. 5 shows an example of an energizing drive signal. Line I depicts the voltage characteristic at one of the input terminals A1 to A10 and line II shows the voltage characteristic for the inner and outer block associated with the electrode track which is to produce the desired display. Line III depicts the resulting voltage across the liquid crystal element, which is the differential voltage between lines I and II. Up to a point in time t1 the track of the illustrated example is not being driven, so that only a voltage as shown in graph c of FIG. 4 is applied to it. The same voltage curve c is also applied across the inner and outer blocks associated with this track, and there will be no display by the liquid crystal panel within the area of this specific track, as demonstrated in line III.

After time t1 the track is energized and the voltage curve a is applied to it. The associated inner block is not being driven, so that only one half of the total available voltage is being applied across the liquid crystal element, and the track section will therefore not appear. However, when the outer block is driven by the signal b, the full drive voltage is applied across the liquid crystal element, so that the electrode track section will be displayed.

From the foregoing, it will be apparent that it is possible to attain the desired drive of the liquid crystal panel for a practically simultaneous, clockwise advancing display of hours, minutes and seconds by means of only three different types of signals.

The time-indicating system can be varied in many ways within the framework of the invention. It is possible, for example, to arrange different numbers M and N of inner blocks and outer blocks, respectively, and a different number L of track cascades. The break-down should be arranged in such a manner that the product of L×M equals the number of electrode tracks being used. The sum of L+M+N gives the total number of terminals required. For example, if twenty track cascades are provided, three inner blocks and three outer blocks are needed if there is a total of sixty electrode tracks. In this case, twenty-six terminals are required for driving the display and the counters 12 to 18 must be designed accordingly.

The present invention may be embodied in other specific forms without departing from the spirit or essential characteristics thereof. The presently disclosed embodiment is therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. An electro-optical time indicating system for indicating real time in the fashion of a clock having dial hands, comprising a liquid crystal display unit including:

a plurality of circumferentially spaced radially disposed electrode tracks divided into a plurality of adjacent groups of tracks, each track having a radially inner section and a radially outer section;

a plurality of backing electrodes divided into inner and outer blocks of backing electrodes respectively associated with the inner and outer sections of the electrode tracks, one pair of radially adjacent inner and outer blocks of backing electrodes being associated respectively with one group of electrode tracks, each block of backing electrodes being respectively connected to an input terminal;

a plurality of non-intersecting electrically conductive lines disposed both radially inward and radially outward of said electrode tracks in a meandering fashion for respectively connecting the electrode tracks of adjacent groups in an alternating order of progression, such that the first electrode track of a first group is electrically connected to the last electrode track of an adjacent group and the last electrode track of said first group is electrically connected to the first electrode track in said adjacent group, whereby each electrode track of each group is electrically connected to a corresponding electrode track in every other group, each of said conductive lines being connected at one end thereof to an associated electrode track input terminal;

a counter control circuit having a plurality of up-down counters, each with a number of stages equal to the number of electrode tracks in a group of tracks, for successively actuating said electrode track input terminals in alternating ascending and descending order, and a plurality of unidirectional counters each with a number of stages equal to the number of one of said inner and outer blocks of backing electrodes for successively actuating the input terminals of said blocks of backing electrodes, wherein a unidirectional counter is associated with each of said up-down counters and is responsive to a change between ascending and descending order of actuation by its associated up-down counter to actuate a succeeding backing electrode block operatively connected thereto; and time multiplexing control means for providing actuating signals to said backing electrode and electrode track input terminals in response to each of said counters such that a simultaneous indication of hours is provided by means of the radially inner sections of said electrode tracks, seconds is provided by means of the radially outer sections of said electrode tracks, and minutes is provided by means of both sections of said electrode tracks.

2. The time indicating system of claim 1 wherein said time multiplexing control means provides three types of actuating signals comprising:

a binary square wave for application to the input terminal of an electrode track which is to be energized;

a first trinary step wave for application to the input terminal of a block of backing electrodes to be energized; and a second trinary step wave of identical shape as said first trinary step wave and phase shifted relative thereto for application to the input terminals of track electrodes and backing electrode blocks which are not energized.

3. The time indicating system of claim 1 wherein the radially inner and outer sections of each respective electrode track are electrically connected in series and wherein the backing electrodes in each respective block are electrically connected with one another and insulated from the backing electrodes in every other block.

* * * * *